United States Patent
Chen

(10) Patent No.: US 9,073,183 B2
(45) Date of Patent: Jul. 7, 2015

(54) ROTARY DEVICE FOR A CUTTING TOOL ASSEMBLING AND DISASSEMBLING APPARATUS

(76) Inventor: Chieh-Yuan Chen, Taichung (TW)

( * ) Notice: Subject to any disclaimer, the term of this patent is extended or adjusted under 35 U.S.C. 154(b) by 645 days.

(21) Appl. No.: 13/449,271

(22) Filed: Apr. 17, 2012

(65) Prior Publication Data

US 2013/0269161 A1     Oct. 17, 2013

(51) Int. Cl.
| B25B 27/14 | (2006.01) |
| B25B 11/02 | (2006.01) |
| B25B 1/00 | (2006.01) |
| B23Q 3/10 | (2006.01) |

(52) U.S. Cl.
CPC ........... *B25B 11/02* (2013.01); *Y10T 29/53961* (2015.01); *B25B 1/00* (2013.01); *B23Q 3/103* (2013.01)

(58) Field of Classification Search
USPC ....................................................... 29/281.1
See application file for complete search history.

(56) References Cited

U.S. PATENT DOCUMENTS

| 4,062,552 A | 12/1977 | Kitaguchi | 279/103 |
| 4,298,208 A * | 11/1981 | Benjamin et al. | 279/91 |
| 5,716,173 A | 2/1998 | Matsumoto | 408/239 A |
| 5,954,347 A | 9/1999 | Buck et al. | 279/20 |
| 5,971,681 A | 10/1999 | Wolfe et al. | 409/233 |
| 6,394,465 B1 * | 5/2002 | Guy | 279/9.1 |
| 6,811,160 B2 * | 11/2004 | Canela Vinas | 279/72 |
| 7,387,479 B1 | 6/2008 | Lee | 409/232 |
| 8,056,905 B1 * | 11/2011 | Lelonek | 279/5 |
| 2010/0325888 A1 * | 12/2010 | Hawes | 29/888.021 |
| 2013/0255884 A1 * | 10/2013 | Baumann et al. | 156/538 |
| 2013/0270778 A1 * | 10/2013 | Chen | 279/46.7 |

* cited by examiner

*Primary Examiner* — Lee D Wilson
*Assistant Examiner* — Alvin Grant
(74) *Attorney, Agent, or Firm* — Alan D. Kamrath; Kamrath IP Lawfirm, P.A.

(57) ABSTRACT

A rotary device for a cutting tool assembling and disassembling apparatus includes an engaging seat with an engaging block. On the engaging block is defined an engaging hole and a threaded hole. A support seat is formed with a receiving cavity and a plurality of positioning grooves around a peripheral edge of the receiving cavity for engaging with the engaging block. The connecting member is inserted through a positioning hole of the support seat and into the engaging hole of the engaging seat. Then, a fastener is screwed in the threaded hole of the engaging seat to fix the connecting member. Thus, the engaging seat can be elastically abutted against the support seat, and the engaging block is selectively engaged in and disengaged from the positioning grooves. Therefore, the angle of the engaging seat can be easily adjusted to facilitate assembling and disassembling of cutting tools.

6 Claims, 4 Drawing Sheets

ROTARY DEVICE FOR A CUTTING TOOL ASSEMBLING AND DISASSEMBLING APPARATUS

BACKGROUND OF THE INVENTION

1. Field of the Invention

The present invention relates to a rotary device for a cutting tool assembling and disassembling apparatus and, more particularly, to a cutting tool assembling and disassembling apparatus whose angle is adjustable.

2. Description of the Prior Art

A conventional tool assembling and disassembling table is normally provided with two holders, with one for holding cutting tools in a vertical position, and with the other for holding cutting tools in a horizontal position. Since there are various types of cutting tools, different cutting tools might be locked to the holders at different angles. When a cutting tool cannot be disassembled on one of the holders, it must be moved to the other holder, which is troublesome. Besides, the cutting tool is likely to impact the table during movement. As a result, the cutting tool is damaged and therefore unable to closely fit the machine on which the cutting tool is to be assembled.

The present invention has arisen to mitigate and/or obviate the afore-described disadvantages.

SUMMARY OF THE INVENTION

The primary object of the present invention is to provide a rotary device for a cutting tool assembling and disassembling apparatus, with the angle of the engaging seat being adjustable.

To achieve the above object, a rotary device for a cutting tool assembling and disassembling apparatus comprises: an engaging seat, a support seat and a connecting member.

The engaging seat includes an engaging block. On the engaging block are defined an engaging hole and a threaded hole in communication with the engaging hole.

The support seat is formed at one side thereof with a receiving cavity. Around a peripheral edge of the receiving cavity is formed a plurality of positioning grooves for engaging with the engaging block. The support seat is formed at another side thereof with a positioning hole which is in communication with the receiving cavity and the engaging hole.

The connecting member is inserted in the support seat and the engaging seat. The connecting member is formed with a flange at one end thereof and an extending section at another end thereof. An elastic member is sleeved on the extending section. The extending section has a diameter smaller than the flange and is inserted through the positioning hole of the support seat and into the engaging hole of the engaging seat in such a manner that a fastener is screwed in the threaded hole of the engaging seat to fix the connecting member. Thus, the engaging seat is elastically abutted against the support seat, and the engaging block is selectively engaged in and disengaged from the positioning grooves.

The engaging seat is used to fix a carrying member which is provided for holding a tool holder.

The positioning hole sequentially includes a first section, a middle section and a second section. The middle section has an inner diameter larger than the first section and is formed with a stop flange. The second section has an inner diameter larger than the middle section and is provided with a step flange. The connecting member is further formed with an abutting section between the flange and the extending section. The elastic member is pressed between the stop flange of the support seat and the abutting surface of the connecting member.

The positioning grooves include a first positioning groove, a second positioning groove, and a third positioning groove, which are spaced from one another by an angle of 90 degrees.

The elastic member is a spring.

The fastener is a screw.

The extending section of the connecting member is inserted through the positioning hole of the support seat and into the engaging hole of the engaging seat in such a manner that a fastener is screwed in the threaded hole of the engaging seat to fix the connecting member. Thus, the engaging seat can be elastically abutted against the support seat, and the engaging block is selectively engaged in and disengaged from the positioning grooves. Therefore, the angle of the engaging seat can be easily adjusted to facilitate assembling and disassembling of cutting tools.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
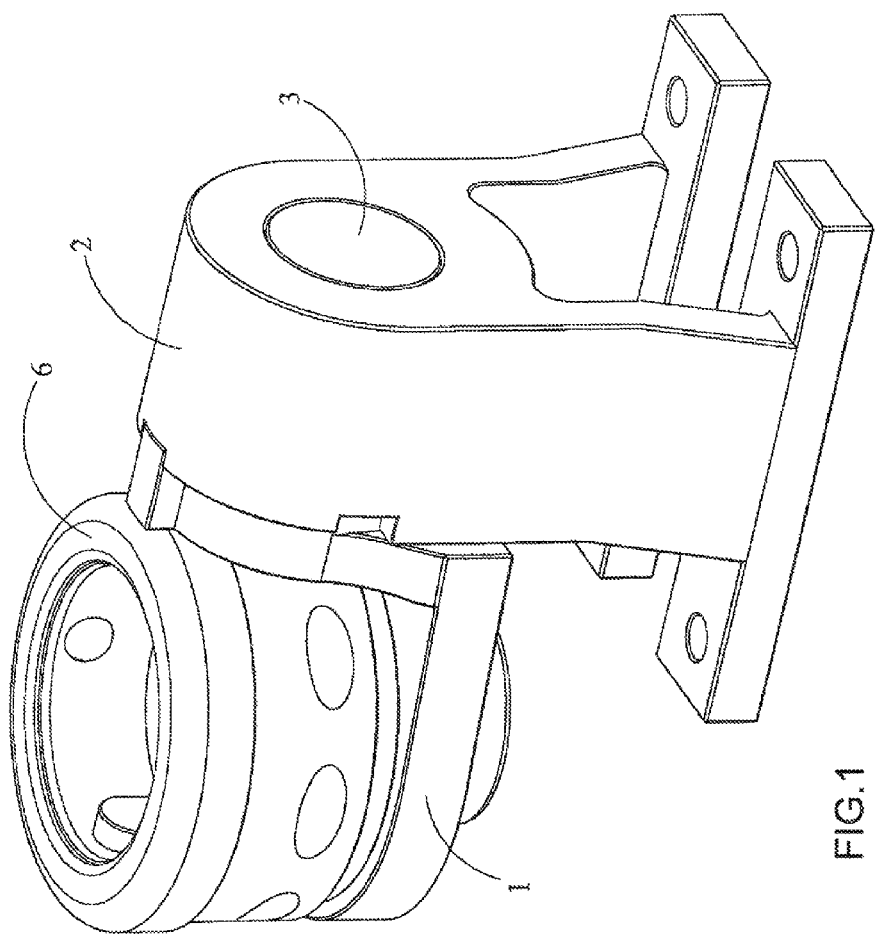
FIG. 1 is a perspective view of a rotary device for a cutting tool assembling and disassembling apparatus in accordance with the present invention.
Figure 2:
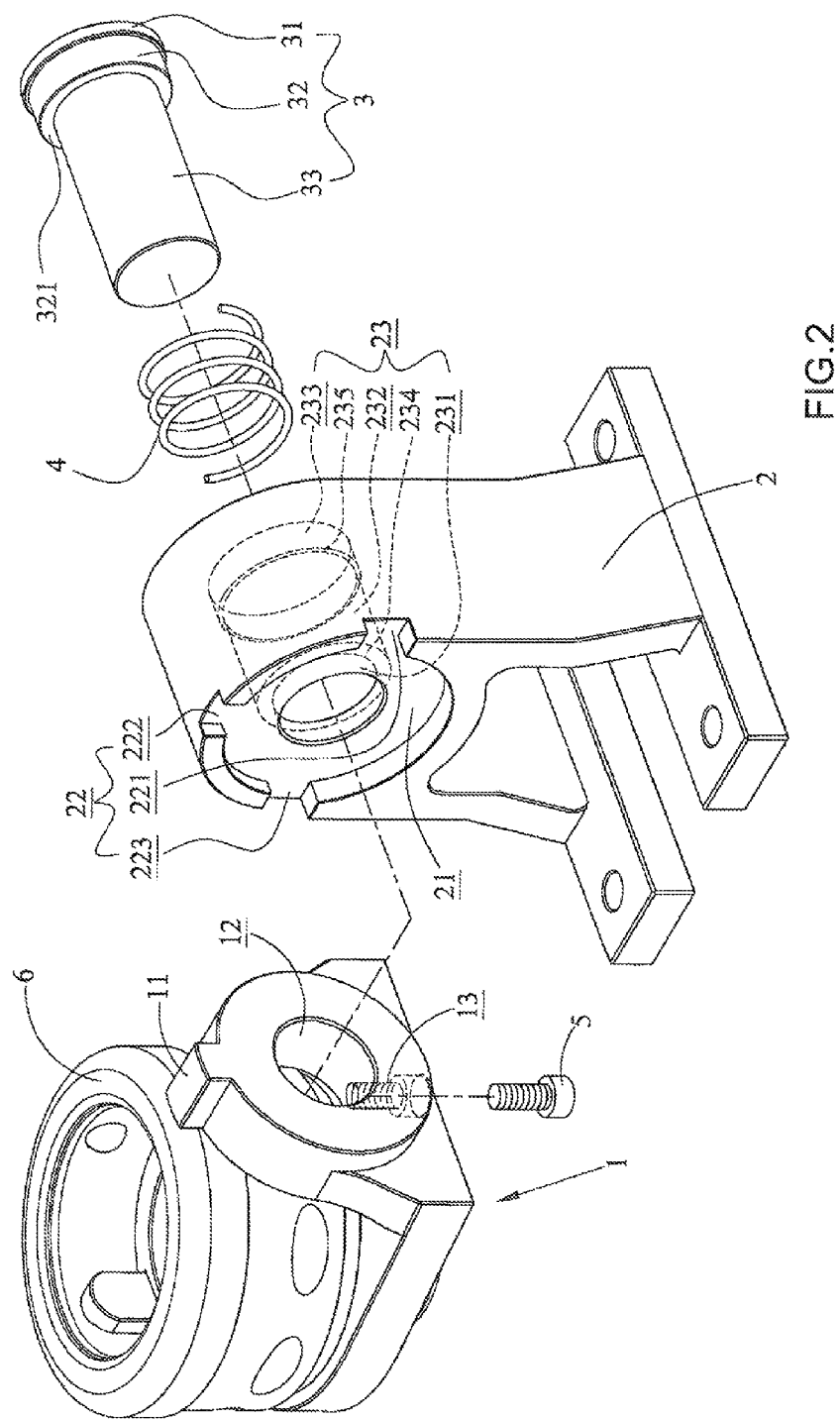
FIG. 2 is an exploded view of the rotary device for a cutting tool assembling and disassembling apparatus in accordance with the present invention.
Figure 3:
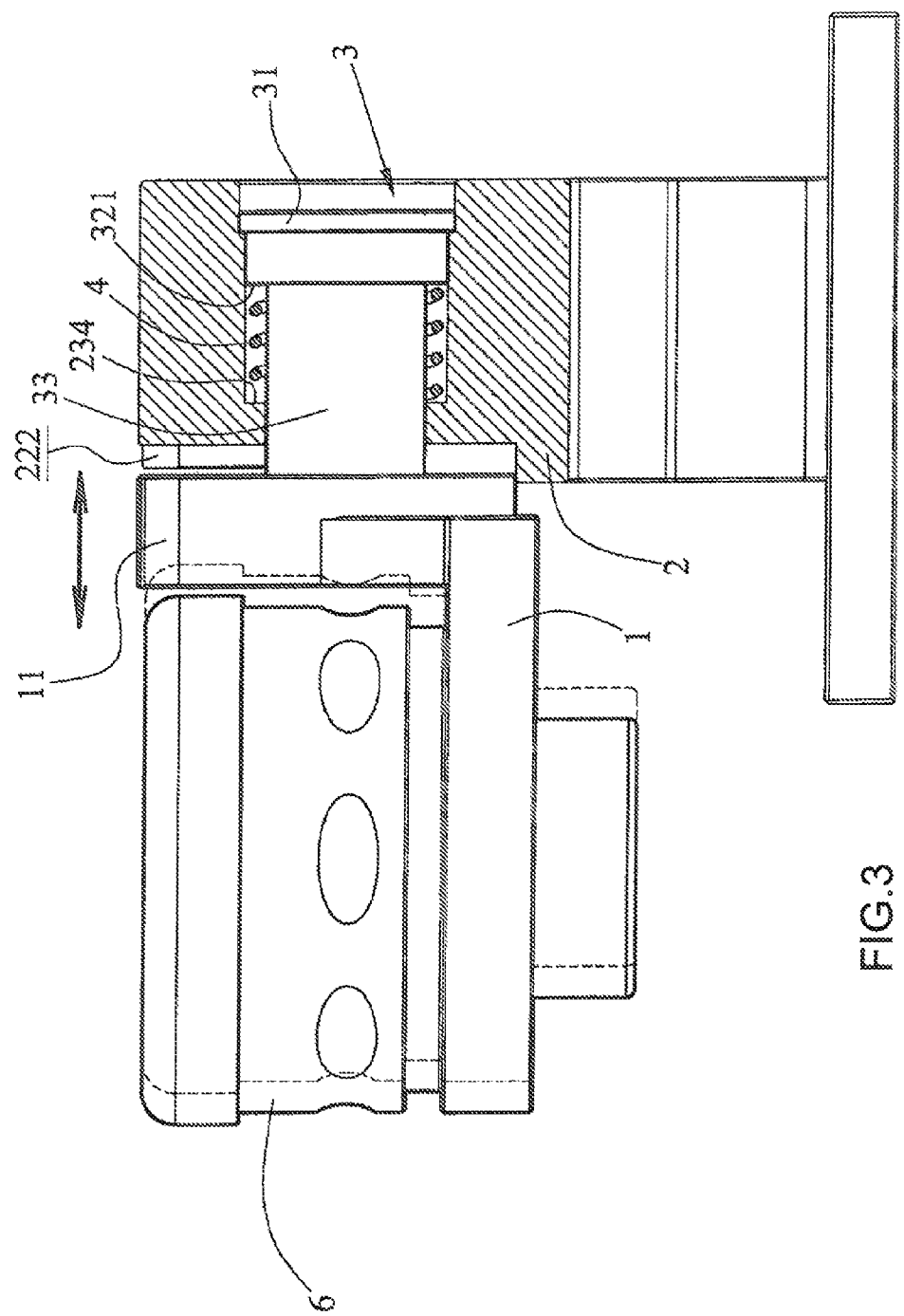
FIG. 3 is a cross sectional view of the rotary device for a cutting tool assembling and disassembling apparatus in accordance with the present invention.
Figure 4:
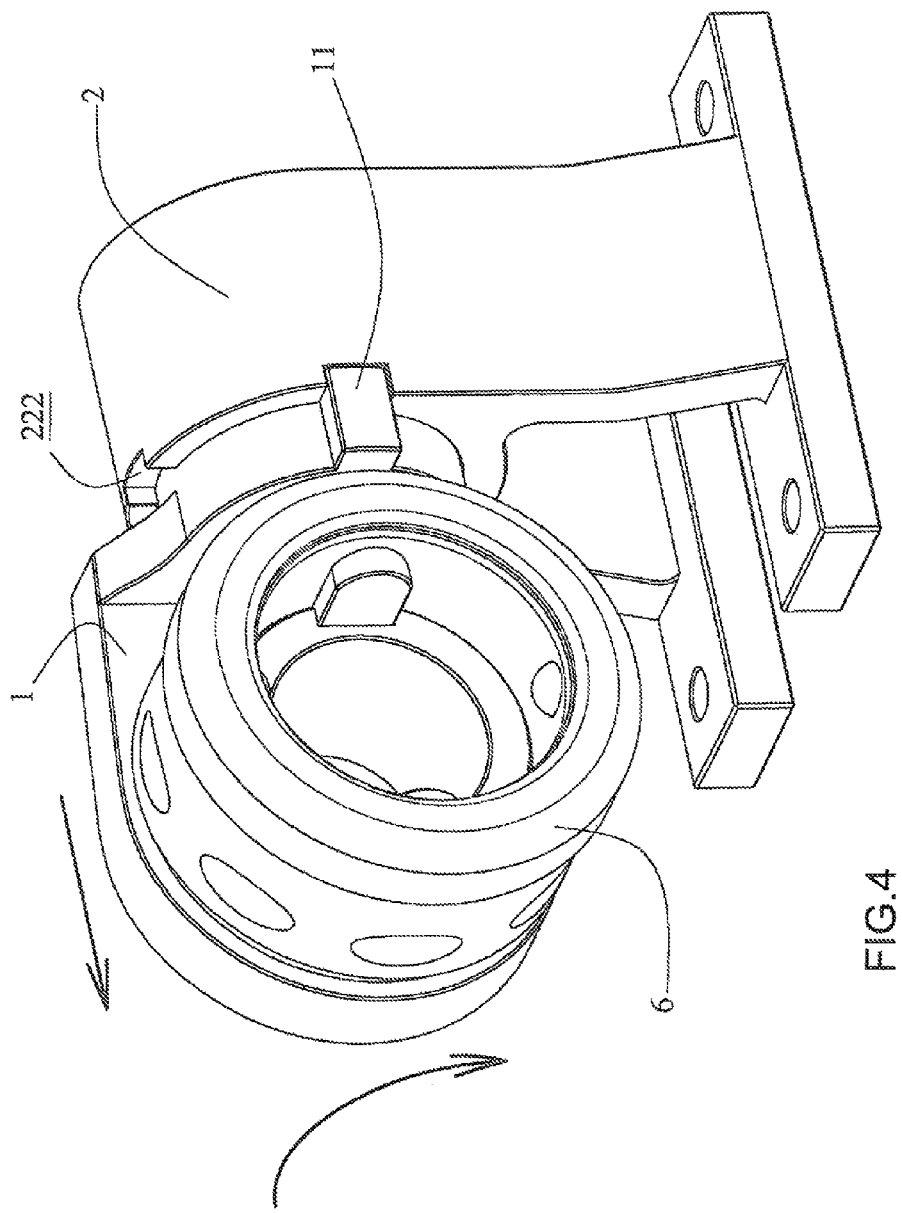
FIG. 4 is an operational view of the rotary device for a cutting tool assembling and disassembling apparatus in accordance with the present invention.

Referring to FIGS. 1-4, a rotary device for a cutting tool assembling and disassembling apparatus in accordance with the present invention comprises an engaging seat 1 for fixing a carrying member 6 which is provided for holding a tool holder (not shown). The engaging seat 1 includes an engaging block 11. On the engaging block 11 is defined an engaging hole 12 and a threaded hole 13 in communication with the engaging hole 12. A support seat 2 is formed at one side thereof with a receiving cavity 21 for holding the engaging seat 1. Around a peripheral edge of the receiving cavity 21 is formed a plurality of positioning grooves 22 for engaging with the engaging block 11. The positioning grooves 22 include a first positioning groove 221, a second positioning groove 222, and a third positioning groove 223, which are spaced from one another by an angle of 90 degrees. The support seat 2 is formed at another side thereof with a positioning hole 23 which is in communication with the receiving cavity 21 and the engaging hole 12. The positioning hole 23 sequentially includes a first section 231, a middle section 232 and a second section 233. The middle section 232 has an inner diameter larger than the first section 231 and is formed with a stop flange 234. The second section 233 has an inner diameter larger than the middle section 232 and is provided with a step flange 235. A connecting member 3 is inserted in the support seat 2 and the engaging seat 1. The connecting member 3 is formed with a flange 31 at one end thereof, an extending section 33 at another end thereof, and an abutting section 32 between the flange 31 and the extending section 33. An elastic member 4 which can be a spring is sleeved on the extending section 33. The abutting section 32 is formed with an abutting surface 321. The extending section 33 has a diameter smaller than the flange 31 and is inserted through the positioning hole 23 of the support seat 2 and into the engaging hole 12 of the engaging seat 1 in such a manner that the elastic member 4 is pressed between the stop flange 234 of the support seat 2 and the abutting surface 321 of the connecting member 3. Then, a fastener 5 which can be a screw is screwed in the threaded hole 13 of the engaging seat 1 to fix the connecting member 3. Thus, the engaging seat 1 is elastically abutted against the support seat 2, and the engaging block 11 can be engaged in or disengaged from the positioning grooves 22, to adjust the angle of the engaging seat 1.

When the engaging seat 1 is in a horizontal position, the engaging block 11 is engaged in the second positioning groove 222. The angle of the engaging seat 1 can be adjusted by pulling the engaging seat 1 to disengage the engaging block 11 from the second positioning groove 222, and, then, rotating the engaging seat 1 to align the engaging block 11 with the first positioning groove 221. Finally, the elastic member 4 pushes the connecting member 3 to move the engaging seat 1 toward the support seat 2. Consequently, the engaging block 11 is pushed into the first positioning groove 221, so that the engaging seat 1 is maintained in a vertical position. The engaging block 11 can also be engaged in the third positioning groove 223 to maintain the engaging seat 1 in another type of vertical position. Therefore, the angle of the engaging seat 1 can be easily adjusted to facilitate assembling and disassembling of cutting tools.

While various embodiments in accordance with the present invention have been shown and described, it is clear to those skilled in the art that further embodiments may be made without departing from the scope of the present invention.

What is claimed is:

1. A rotary device for a cutting tool assembling and disassembling apparatus comprising:
    an engaging seat including an engaging block, wherein on the engaging block is defined an engaging hole and a threaded hole in communication with the engaging hole;
    a support seat formed at one side thereof with a receiving cavity, wherein around a peripheral edge of the receiving cavity is formed a plurality of positioning grooves for engaging with the engaging block, with the support seat formed at another side thereof with a positioning hole in communication with the receiving cavity and the engaging hole;
    a connecting member inserted in the support seat and the engaging seat, with the connecting member formed with a connecting flange at one end thereof, with an extending section at another end thereof;
    an elastic member sleeved on the extending section, with the extending section having a diameter smaller than the connecting flange and inserted through the positioning hole of the support seat and into the engaging hole of the engaging seat; and
    a fastener screwed in the threaded hole of the engaging seat to fix the connecting member, wherein the engaging seat is elastically abutted against the support seat, and wherein the engaging block is selectively engaged in and disengaged from the plurality of positioning grooves.

2. The rotary device for a cutting tool assembling and disassembling apparatus as claimed in claim 1, wherein the engaging seat fixes a carrying member for holding a tool holder.

3. The rotary device for a cutting tool assembling and disassembling apparatus as claimed in claim 1, wherein the positioning hole sequentially includes a first section, a middle section and a second section, wherein the middle section has an inner diameter larger than the first section and is formed with a stop flange, wherein the second section has an inner diameter larger than the middle section and is provided with a step flange, wherein the connecting member is further formed with an abutting section between the connecting flange and the extending section, and wherein the elastic member is pressed between the stop flange of the support seat and the abutting surface of the connecting member.

4. The rotary device for a cutting tool assembling and disassembling apparatus as claimed in claim 1, wherein the plurality of positioning grooves includes a first positioning groove, a second positioning groove, and a third positioning groove, which are spaced from one another by an angle of 90 degrees.

5. The rotary device for a cutting tool assembling and disassembling apparatus as claimed in claim 1, wherein the elastic member is a spring.

6. The rotary device for a cutting tool assembling and disassembling apparatus as claimed in claim 1, wherein the fastener is a screw.

* * * * *